Aug. 26, 1969  F. COOKE  3,463,195
PIPELINE PLUGGERS
Filed Jan. 10, 1966  5 Sheets-Sheet 2
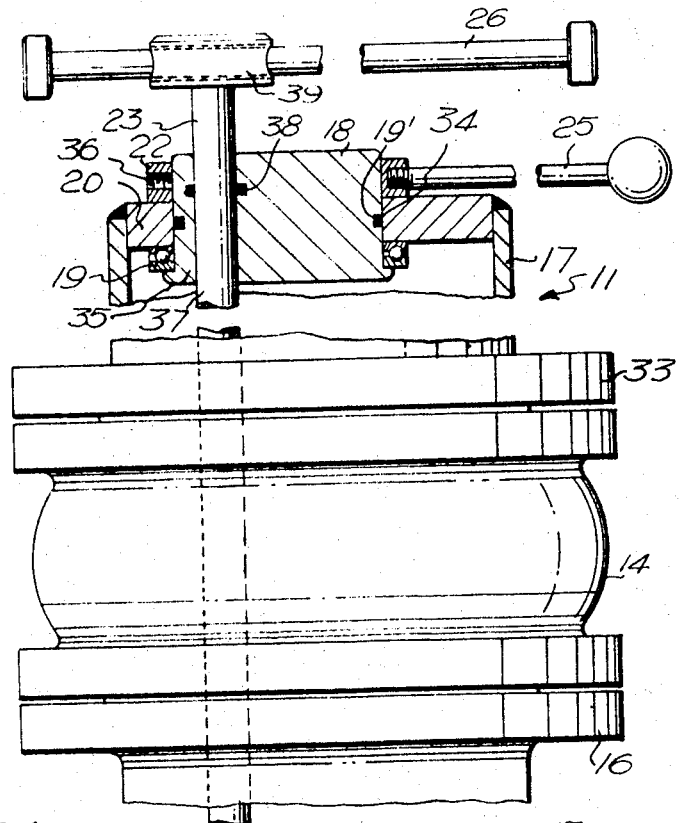
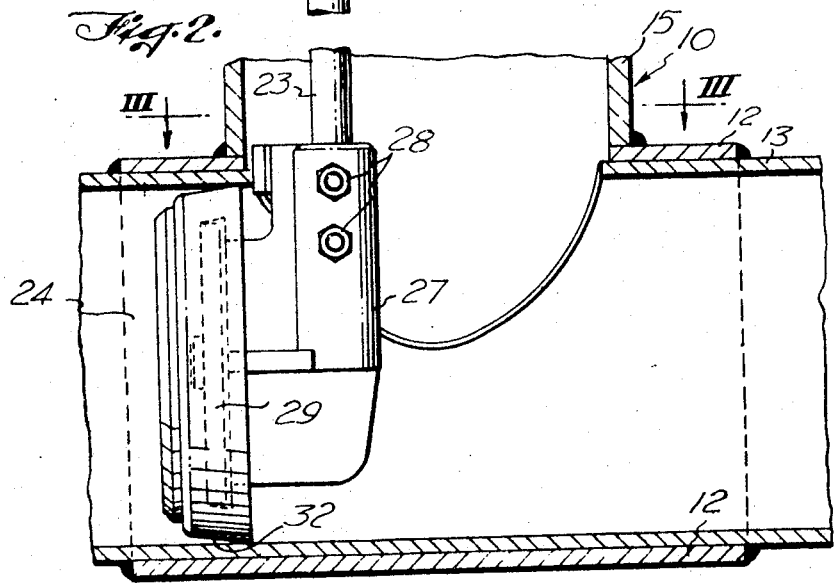
Fig. 2.
INVENTOR:
FRANK COOKE
BY
Breitenfeld & Levine
ATTORNEYS Aug. 26, 1969   F. COOKE   3,463,195
PIPELINE PLUGGERS Filed Jan. 10, 1966   5 Sheets-Sheet 3

INVENTOR:
FRANK COOKE
BY
Breitenfeld & Levine
ATTORNEYS

Aug. 26, 1969 F. COOKE 3,463,195
PIPELINE PLUGGERS
Filed Jan. 10, 1966 5 Sheets-Sheet 4

INVENTOR:
FRANK COOKE
BY
ATTORNEYS

United States Patent Office 3,463,195
Patented Aug. 26, 1969

3,463,195
PIPELINE PLUGGERS
Frank Cooke, Mottram St. Andrew, near Macclesfield, England, assignor to E. Pass & Company Limited, a company of Great Britain, Northern Ireland and the Isle of Man
Filed Jan. 10, 1966, Ser. No. 519,539
Claims priority, application Great Britain, Jan. 30, 1965, 4,196/65
Int. Cl. F16l *55/10, 55/18*
U.S. Cl. 138—94          4 Claims

ABSTRACT OF THE DISCLOSURE

Apparatus for plugging a pipe in which a hole has been drilled, the apparatus having a plug carried on a shaft which may be inserted into the pipe, the shaft being eccentrically mounted in a rotatable hub which is itself eccentrically mounted in a body adapted to be clamped on to the pipe whereby the plug may be positioned to seal the pipe by appropriate rotation of the plug carrying shaft and of the hub relative to the body.

---

This invention concerns pipeline pluggers.

It is sometimes necessary to seal off a section of fluid-carrying pipeline, for instance when repairs are necessary, and the principal object of the present invention is to provide, for use at such times, improved apparatus for plugging a pipeline at a given location.

According to the present invention pipeline plugging apparatus comprises a pipe-embracing assembly including a valve and adapted to support under-pressure drilling equipment whilst said equipment is employed to drill a hole through the pipe wall capable of admitting a pipe-sealing plug, and a plug assembly adapted to replace said drilling equipment after the drilling of said hole, comprising a shaft, carrying said plug and mounted in a hub, said shaft being in sealing relationship with said hub but rotatable therein, said hub being in sealing relationship with the main body of said assembly but rotatable therein, and the axes of rotation of the shaft and hub being such that the plug may be introduced through the hole and into the pipe and then manipulated by means of said shaft and said hub into sealing relationship with the pipe to one side of the hole.

Further objects and advantages of the invention will become apparent from the following description of one embodiment of the invention given by way of example only and with reference to the accompanying drawings.

In the drawings:

FIG. 2 is a partly sectioned view of the pipe of FIG. 1 carrying the plug assembly which is blocking the pipe;

Figure 1:
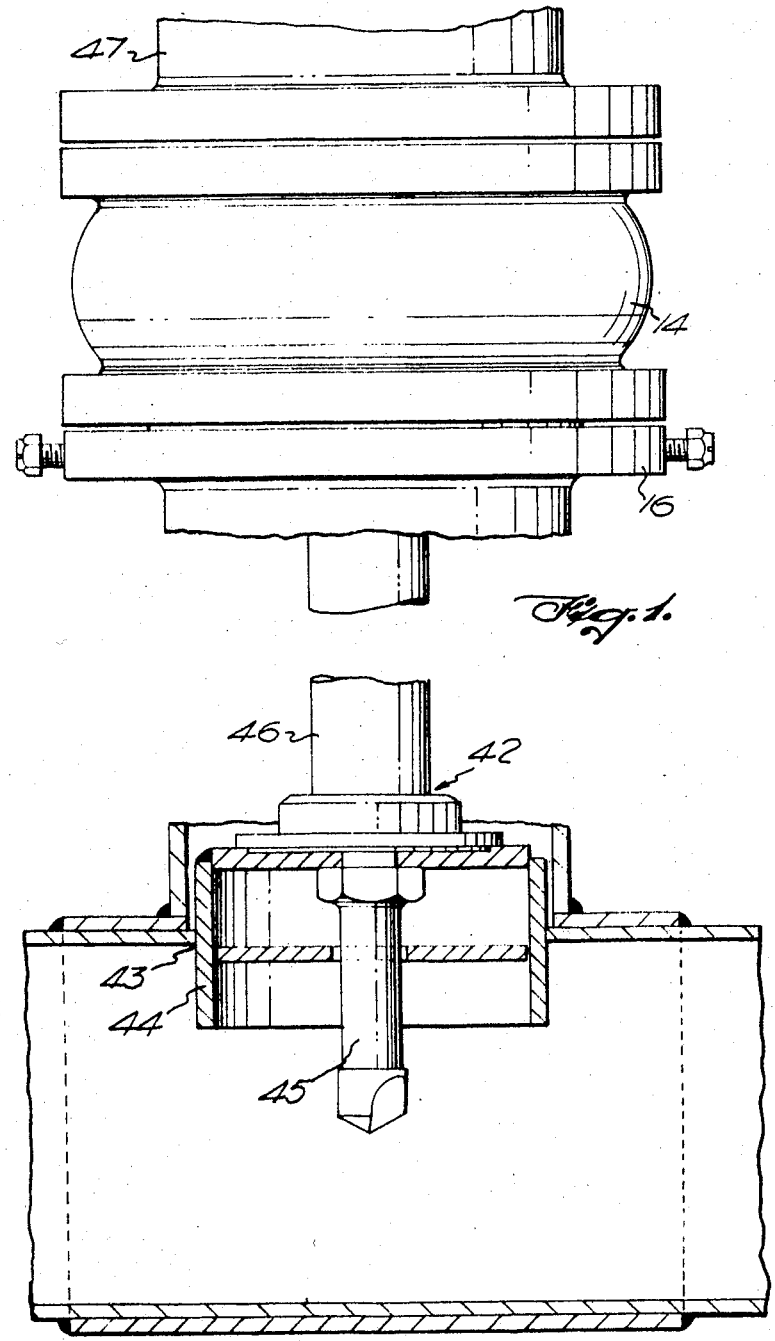
FIG. 1 is a partly sectioned view of a pipe carrying a cutter assembly which is in use for cutting a hole in the pipe.

Referring to the drawings, this pipeline plugger consists of two main assemblies: a pipe-embracing assembly indicated at 10 and a plug assembly indicated at 11.

The pipe-embracing assembly 10 comprises a split T 12, the two halves of which are adapted to be secured in sealing contact around the pipe 13 to be plugged. The pipe-embracing assembly also comprises valve 14. One half of the T, the upper part, in use, has an upwardly extending cylindrical portion 15 which terminates with a flange 16 to which is detachably secured the valve 14, this being of any suitable type capable of arresting the flow of fluid from the pipe 13 in operation, as is later described. The valve 14 is also designed so that under-pressure drilling equipment of known type may be secured thereto, and, with the valve open, may be used to drill a hole through the pipe wall, the drill means being accommodated during this operation by the cylindrical portion 15 of the T 12.

The plug assembly 11 comprises a hollow, generally cylindrical support member 17 with an upper end plate 20, a plug positioning hub 18, a thrust race 19 and retaining collar 22 by which the hub is mounted in the plate 20. A shaft 23 is pivotally carried in the hub 18 and a plug indicated generally at 24 is mounted on the lower end of the shaft 23. The hub 18 and the shaft 23 have operating handles 25 and 26.

The plug 24 comprises an L-shaped member 27 bolted to the lower end of the shaft 23 by means of bolts 28 and carrying a disc 29 with its axis at right angles to that of the shaft. The disc 29 carries a dish-shaped resilient washer 32.

The support member 17 has at one end a flange 33 by means of which it may be attached coaxially to the valve 14. At the other end the member 17 is closed, except that a hole 34 is bored in its end plate 20, eccentrically, to accommodate the plug positioning hub 18. The hub 18 is disposed in this hole 34, an external O-ring 19' ensuring sealing contact. The lower end of the hub is outwardly flanged at 35 and the thrust race 19 is disposed between this flange 35 and the underside of the plate 20. The hub retaining collar 22 is secured to the hub 18 by a grub screw 36 and serves to hold the hub in place and also carries the handle 25 extending therefrom by means of which the hub can be rotated.

The hub 18 is bored through, off-centre at 37 to accommodate the shaft 23, an O-ring 38 again being employed to ensure sealing contact. The shaft 23 is long enough to extend down into the pipe 13 and carries at this end, as explained above, bolted to one side thereof, a rigid L-shaped arm 27 carrying a suitable sealing element of the cup type. The other end of the shaft 23 which extends above the hub 18 carries the handle 25 attached thereto whereby the shaft 23, and therefore the plug 24 can be rotated. This handle 25 takes the form of a bar slidable in a transverse boss 39 at the upper end of the shaft 23.

In use, when it is wished to plug say, a water pipe line 13, the following procedure is adopted, the degree of eccentricity of the axes of the hub 18 and of the shaft 23 being selected to enable the necessary manipulations to be carried out. First the T 12 is welded in place around the pipe 13. Then the valve 14 is secured in place, under pressure drilling equipment indicated at 42 is mounted in position, and with the valve 14 open, the pipe wall is drilled through at 43 the diameter of the hole being little less than the internal diameter of the pipe.

The under pressure drilling equipment 42 comprises cutter means 44 with a central drill 45 mounted at the lower end of a shaft 46. The shaft 46 is provided at its upper end with means, for example, nut and screw means and a motor indicated in a housing assembly 47 whereby the shaft and the cutter 44 may be raised and lowered in order to effect the drilling operation. A motor for example a hydraulic motor, air motor or other prime mover is provided to rotate the cutter 44.

After the hole 43 has been drilled and the cut out portion 48 has been removed on the borer 45 by retracting the shaft 46 into the housing 14 assembly 47, the valve is then closed, the drilling equipment is removed, and the plug assembly 11 is secured in position in its place. The valve 14 is opened once more and the handles 25 and 26 of the hub 18 and shaft 23 are then manipulated until the plug lies above the valve 14 and is disposed transversely of the pipe 13, near to the plane of the centre line of the hole 43 therein and with the open end of its cup or dish 32 facing away from the direction of flow of liquid in the pipe. The valve 14 is then opened, and the shaft 23 is lowered so that the plug 24 enters the pipe 13 through the hole 43 in this disposition. Once the plug 24 is fully within the pipe, the handles 25 and 26 are again manipulated until the plug 24 has been turned through 180° and lies within the pipe to one side of the hole 43 and with its open cup facing the flow of liquid in the pipe. It accordingly comes into sealing engagement with the pipe bore as illustrated in FIG. 2 arresting the flow and enabling the pipe to the other side of the hole 43 to be repaired. The differential pressure across the sealing plug 24, when the pressure in the pipe 13 is released presses the plug against the inside of the pipe to make an effective seal.

Figure 3:
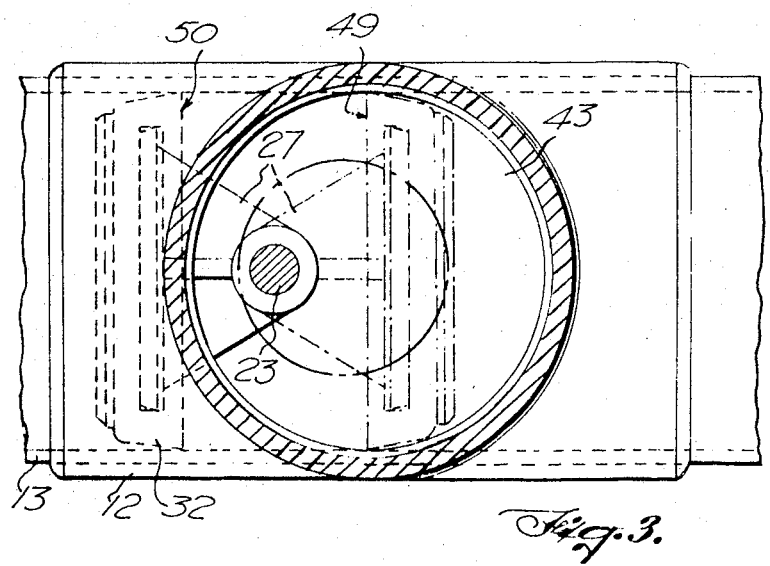
FIG. 3 is a section on the line III—III of FIG. 2 showing two positions of the plug.

The disposition of the plug 24 when introduced through the hole 43 into the pipe is shown in FIG. 3 at 49 and the disposition of the plug after manoeuvering into a sealing position in the pipe by means of the handles 25 and 26 is shown in FIG. 3 at 50. As already mentioned, the degree of eccentricity of the mounting of the hub 18 and shaft 23 is chosen to enable the manipulation to be easily carried out.

Figure 4:
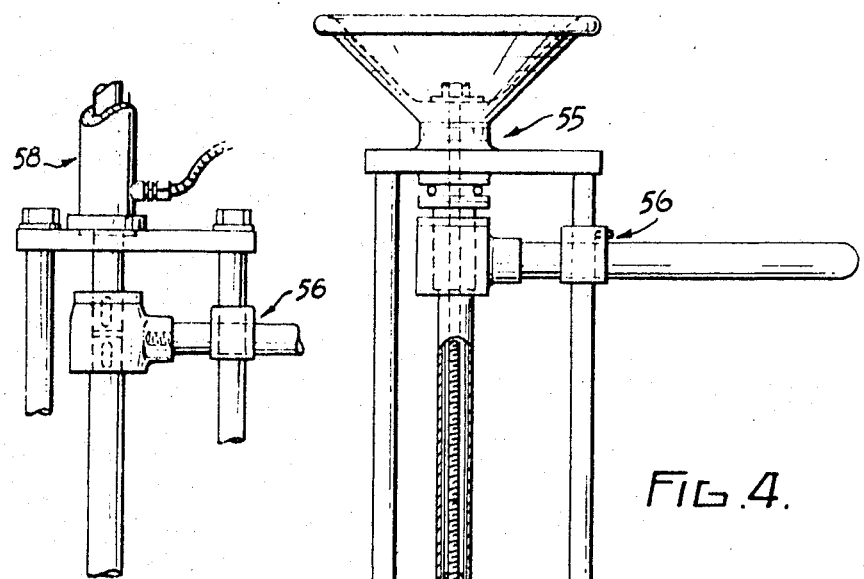
FIG. 4 is a partly sectioned view of the pipe of FIG. 1 carrying an alternative plug assembly which is blocking the pipe.

As an alternative to the handles for manual rotation and manipulation of the shaft 23 and the hub 18, power operated means (FIG. 4) may be provided for this purpose. Such means may include a screw mechanism 55 for screwing the shaft 23 into and out of the pipe in which case a coupling 56 is included to enable the inner end of the shaft to be maintained stationary during the screwing in or out. Further means including a ratchet arrangement 57 are then provided for enabling the hub 18 and the inner end of the shaft 23 carrying the sealing plug to be rotated to bring the plug into a sealing position.

Figure 5:
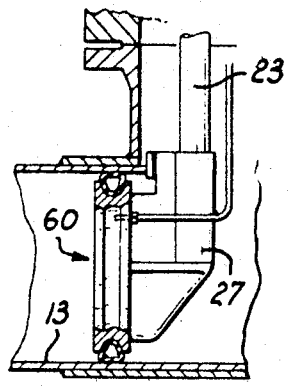
FIG. 5 is a fragmentary view of the upper part of another plug assembly including a hydraulic piston-cylinder device.

The shaft 23 may also be arranged under the control of a hydraulic piston and cylinder device 58 to enable it to be moved into and out of the pipe, as shown in FIG. 5.

Figure 6:
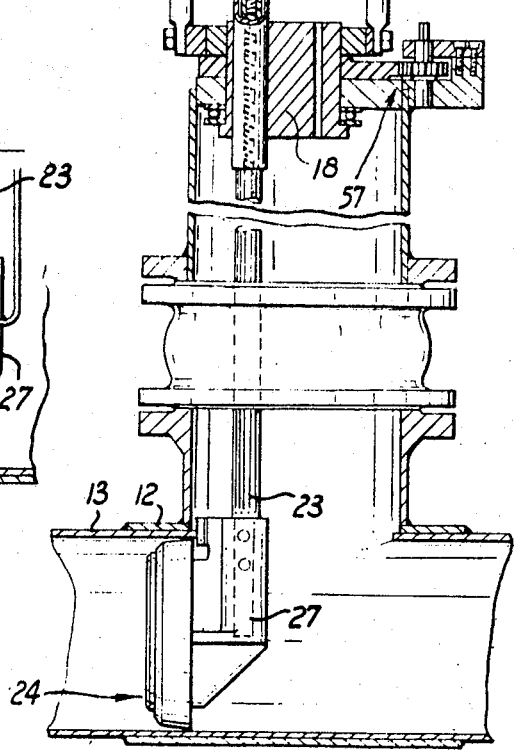
FIG. 6 is a fragmentary view of a plug assembly including an inflatable plug.

In the drawings, the sealing plug comprises a rubber cup 32 but an inflatable sealing plug 60 (FIG. 6) which can be distended by introduction of fluid under pressure may be used in place of the sealing plug shown.

Figure 7:
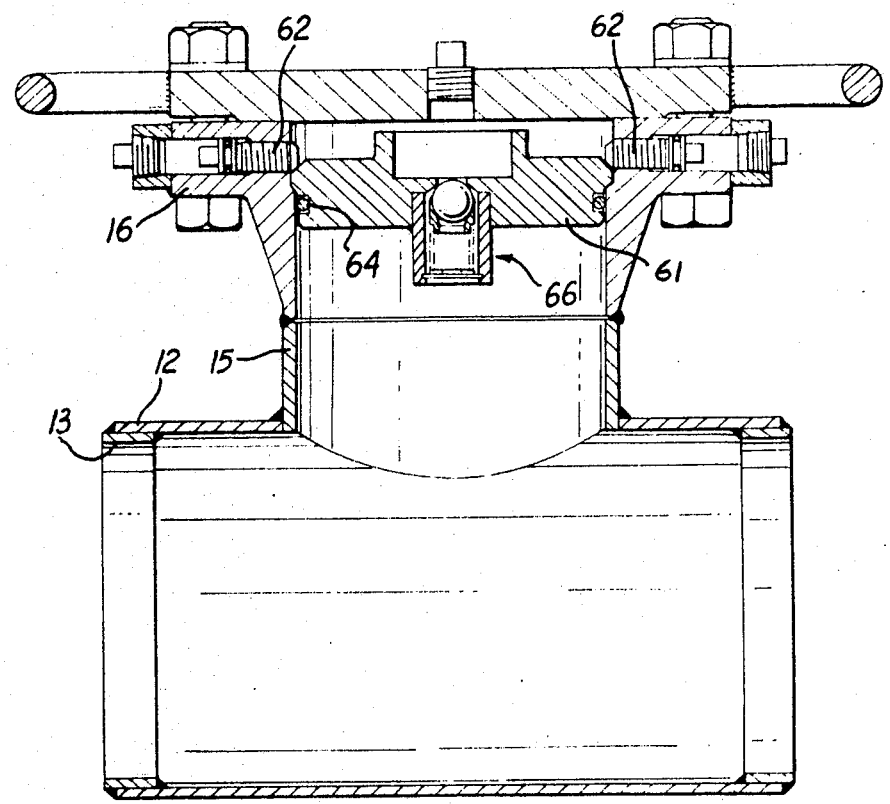
FIG. 7 is a sectional view showing how the pipe is closed for use after repairs have been completed.

When it is desired to allow flow in the pipe 13 after repairs have been completed, a sealing plug 61 (FIGS. 4 and 7) can be inserted in the cylindrical portion 15 and held in place by bolts 62 in the flange 16 which extend through holes in the flange and enter recesses in the plug. The plug is made of metal and has a rubber O-ring 64 which seals it to the inside of the cylindrical portion 15. The plug is provided with spring loaded pressure relief valve 66 held open by a plunger during insertion of the plug and which closes due to the pressure of fluid in the pipe 13 when the plunger is retracted. The apparatus according to the invention is not limited in use to the plugging of water pipes and can serve equally for plugging gas pipe lines.

I claim:
1. Pipeline plugging apparatus comprising:
(1) a pipe embracing assembly including a valve, said assembly adapted to support under-pressure drilling equipment whilst said equipment is employed to drill a hole through the pipe wall capable of admitting a pipe-sealing plug;
(2) a plug assembly adapted to replace said drilling equipment after drilling of said hole, said plug assembly comprising;
(3) an assembly body,
(4) a hub eccentrically and rotatably mounted in said body and in sealing relationship therewith;
(5) a shaft rotatable and slidable in said hub and in sealing relationship therewith, the axis of rotation of said shaft being parallel to and spaced from the axis of rotation of said hub;
(6) a plug carried eccentrically on said shaft whereby when said plug assembly is placed in position after drilling of said hole and said valve is opened the plug can be introduced into the pipe through the hole by sliding said shaft and the plug can then be moved, by rotation of said shaft and hub, into sealing relationship with the pipe at a position to one side of said hole.

2. Pipeline plugging apparatus comprising:
(1) a pipe embracing assembly including a valve;
(2) under-pressure drilling equipment adapted to be supported on said assembly for drilling a hole through a pipe wall when said valve is open;
(3) a plug assembly adapted to replace said drilling equipment after drilling of said hole, the changeover being carried out whilst said valve is closed, said plug assembly comprising;
(4) an assembly body;
(5) a hub eccentrically and rotatably mounted in said body and in sealing relationship therewith;
(6) a shaft rotatable and slidable in said hub and in sealing relationship therewith, the axis of rotation of said shaft being parallel to and spaced from the axis of rotation of the said hub;
(7) a plug carried eccentrically on the inner end of said shaft whereby when said valve is open the plug can be introduced into the pipe through the hole by sliding said shaft in the hub and the plug can then be moved by rotation of the shaft and the hub and can thus be brought into sealing relationship with the pipe at a position to one side of said hole.

3. Pipeline plugging apparatus comprising;
(1) a pipe embracing assembly for welding around the pipe to form a T-member surrounding said pipe;
(2) a valve adapted to be mounted on the stem of the T-member for sealing said T-member, said valve being adapted to support under-pressure drilling equipment for drilling a hole through the pipe wall whilst said valve is open;
(3) a plug assembly adapted to replace said drilling equipment on said valve, said plug assembly comprising:
(4) a generally tubular assembly body closed at one end and adapted to be secured at its other end on said valve;
(5) a hub eccentrically and rotatably mounted in said closed end of the assembly body, the axis of said hub passing through the centre line of the pipe;
(6) a sealing ring carried between said hub and said closed end and sealing said hub to the assembly body;
(7) a shaft rotatably and slidably mounted in said hub, the axis of rotation of said shaft being parallel to and spaced from the axis of rotation of said hub;
(8) a sealing ring carried in said hub and in engagement with said shaft sealing said shaft to said hub;
(9) a handle on the outer end of said shaft;
(10) a plug carried on the inner end of said shaft offset from the axis thereof whereby, on opening said valve the plunger can be introduced into the pipe through the hole therein by sliding said shaft in the hub and the plug can then be moved by rotation of said shaft and hub and brought into a sealing position in the pipe to one side of said hole.

4. A method of plugging a pipe comprising the steps of securing round said pipe and in sealing relationship therewith a pipe-embracing assembly including a valve, securing under pressure drilling equipment on said assembly, opening said valve and extending said drilling equipment through the valve to drill a hole in the wall of said pipe retracting said drilling equipment, closing said valve and removing the drilling equipment, replacing said equipment by a plug assembly including a plug on a shaft eccentric in a hub eccentric in a housing for said plug assembly, the axes of rotation of said shaft and hub being spaced apart and parallel to each other, orienting said plug for introduction through the hole in said pipe, opening said valve and introducing said plug on said shaft into said pipe and thereafter manipulating said plug on said two eccentric axes to bring the plug into sealing engagement within said pipe to plug same to one side of said hole.

References Cited

UNITED STATES PATENTS

| | | | |
|---|---|---|---|
| 2,886,068 | 5/1959 | Ver Nooy | 138—94 |
| 3,154,106 | 10/1964 | Ver Nooy | 138—94 |
| 2,899,983 | 8/1959 | Farris | 138—94 X |

FOREIGN PATENTS 546,633    7/1942    Great Britain.

SAMUEL ROTHBERG, Primary Examiner

E. J. EARLS, Assistant Examiner

U.S. Cl. X.R.

138—93, 97